(12) United States Patent
Gibbs (10) Patent No.: US 8,291,373 B2
(45) Date of Patent: Oct. 16, 2012

(54) GENERATING LOADRUNNER SCRIPTS

(75) Inventor: Steven J. Gibbs, Auburn Hills, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1068 days.

(21) Appl. No.: 12/191,160

(22) Filed: Aug. 13, 2008

(65) Prior Publication Data

US 2010/0042970 A1 Feb. 18, 2010

(51) Int. Cl.
*G06F 9/44* (2006.01)

(52) U.S. Cl. ......... 717/106; 717/124; 717/125; 717/126

(58) Field of Classification Search .................. 717/124
See application file for complete search history.

(56) References Cited

U.S. PATENT DOCUMENTS

| | | | |
|---|---|---|---|
| 6,701,514 B1 * | 3/2004 | Haswell et al. | 717/115 |
| 7,328,134 B1 * | 2/2008 | Burbidge et al. | 702/186 |
| 7,620,856 B2 * | 11/2009 | Kagan et al. | 714/57 |
| 7,734,775 B2 * | 6/2010 | Barnett et al. | 709/224 |
| 2002/0147942 A1 * | 10/2002 | Moe et al. | 714/38 |
| 2002/0177977 A1 * | 11/2002 | Scarlat et al. | 702/186 |
| 2004/0249830 A1 | 12/2004 | Sonkin et al. | |
| 2005/0256882 A1 * | 11/2005 | Able et al. | 707/10 |
| 2006/0212567 A1 * | 9/2006 | Gulledge et al. | 709/224 |
| 2007/0094372 A1 * | 4/2007 | Hariharan et al. | 709/223 |
| 2007/0094541 A1 | 4/2007 | Kang | |
| 2008/0016244 A1 * | 1/2008 | Noonan et al. | 709/246 |
| 2008/0072100 A1 | 3/2008 | Okada | |

* cited by examiner

*Primary Examiner* — Li B Zhen
*Assistant Examiner* — Viva Miller (57) ABSTRACT

The present disclosure is directed to a system and method for generating LoadRunner scripts. In some implementations, a method for generating a LoadRunner script includes receiving a request to execute one or more transactions with a COBOL application of a mainframe to evaluate one or more mainframe services. In response to at least the service request, a script executable by a LoadRunner application is automatically generated. The LoadRunner script generates one or more MQSeries transactions that execute transactions with the COBOL application of the mainframe.

16 Claims, 10 Drawing Sheets

GENERATING LOADRUNNER SCRIPTS

TECHNICAL FIELD

This invention relates to evaluating systems and, more particularly, to generating LoadRunner scripts.

BACKGROUND

Load testing is a process by which a software application is tested under stress (or load) as the software application will be experiencing during real-time operation environment. Typically, software applications are tested in a fashion similar to the manner that the software application will be used in the operating environment of the customers. Hence, a test engineer needs to understand how a human user would use the software application, and then devises a method on how the human usage can be automated through the use of a software testing tool, such as LoadRunner manufactured by Hewlett Packard (HP) and previously Mercury Interactive. One problem with the above-described method is that it typically requires a significant amount of time of a skilled programmer to generate the scripts in the correct mainframe format for performance and loads.

SUMMARY

The present disclosure is directed to a system and method for generating LoadRunner scripts. In some implementations, a method for generating a LoadRunner script includes receiving a request to execute one or more transactions with a COBOL application of a mainframe to evaluate one or more mainframe services. In response to at least the service request, a script executable by a LoadRunner application is automatically generated. The LoadRunner script generates one or more MQSeries transactions that execute transactions with the COBOL application of the mainframe.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
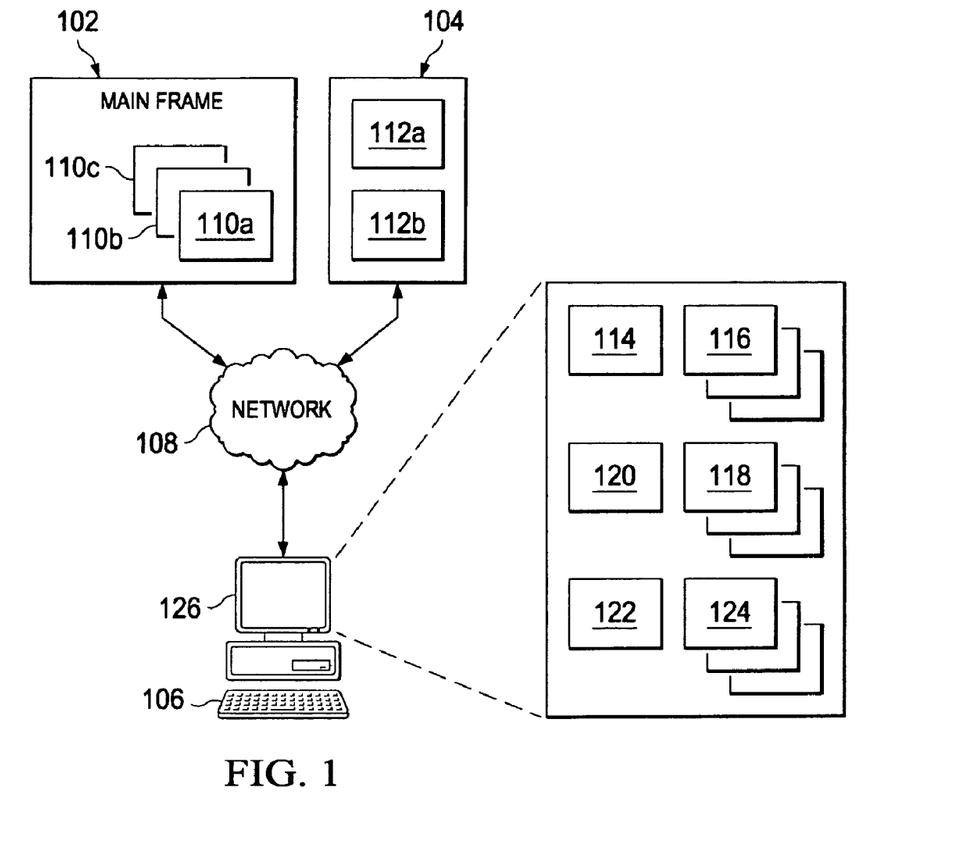
FIG. 1 is an example evaluation system for automatically generating one or more LoadRunner scripts.

FIG. 1 illustrates an example evaluation system 100 for generating LoadRunner scripts to evaluate performances of mainframes. For example, the system 100 may automatically generate LoadRunner scripts that generate MQSeries transactions for mainframes. In general, the LoadRunner application is a performance and load testing product distributed by HP (since it acquired Mercury Interactive in November 2006) for examining system behavior and performance while generating actual load. In some implementations, the LoadRunner application may emulate hundreds or thousands of concurrent users and/or transactions to collect information from infrastructure components. MQSeries transactions are transactions processable and managed by IBM WebSphere MQ products (or MQSeries products) and generally include MQSeries queues for different applications. For example, the MQSeries queues may queue transactions between different platforms such as Windows and mainframes. In some implementations, the system 100 may automatically generate a script executable by LoadRunner such that the LoadRunner script generates one or more MQSeries messages executing transactions with, for example, a mainframe. In some cases, the system 100 may include mainframes executing COBOL applications. In this case, the system 100 may automatically generate LoadRunner scripts configured to generate MQSeries transactions for COBOL applications executed by a mainframe. In some implementations, the system 100 may automatically generate LoadRunner scripts based, at least in part, on technical information for COBOL programs and hexadecimal packets of data communicated between MQSeries queues and the COBOL programs. By automatically generating LoadRunner scripts for MQSeries transactions, the system 100 may eliminate, minimize or otherwise reduce cost of and/or time for performance and load testing mainframes such as COBOL-based mainframes.

In the illustrated implementation, the system 100 includes a mainframe 102, an MQSeries system 104, and a client 106 communicably coupled through a network 108. The mainframe 102 may execute one or more applications 110a-c to provide services to a plurality of users. In some implementations, the one or more applications 110a-c may process bulk transactions such as, for example, census, industry and consumer statistics, enterprise resource planning (ERP), financial transaction processing, and/or other bulk processes. The MQSeries system 104 may includes MQSeries queues 112a and 112b for queuing messages between the mainframe 102 and other network elements (e.g., client 106). The client 106 includes a LoadRunner program 114 for executing scripts to evaluate system performances, variable files 116 for mapping variables processable by the applications 110 to variables processable by the LoadRunner application 114, hex files 118 for mapping hexadecimal (hex) data for MQSeries transactions between different formats (e.g., ASCII, EBCDIC), a script application 120 for automatically generating LoadRunner scripts, a LoadRunner script 122 that generates MQSeries messages to execute transactions with the applications 110, reports 124 for identifying results of the evaluation processes, and the Graphical User Interface (GUI) 126.

In some implementations, the system 100 can include two processes: (1) generating the variable files 116 and the hex files 118; and (2) automatically generating LoadRunner scripts that execute MQSeries transactions with the mainframe 102 based, at least in part, on the variable files 116 and the hex files 118. In regards to generating the files 116 and 118, the user may generate the variable files 116 for both send and receive variables based, at least in part, on technical information such as Protocol Implementation Conformance Statement (PICS). For example, variable file 116 may include send and/or receive variables for the application 110 and associated variables processable by the LoadRunner application 114. In other words, the variable file 116 may map variables compatible with the application 110 to variables compatible with the LoadRunner application 114. In addition, the user may determine hex data for variables processable by the applications 110 and generate the hex files 118 based, at least in part, on the identified hex data and data compatible with the LoadRunner application 114. For example, the script application 120 may turn off send channels in the MQSeries system 104 and identify hex data for different send variables for the application 110. In addition, the script application 120 may turn off the receive channels in the MQSeries system 104 to identify hex data for different receive variables for the application 110. Based, at least in part, on the identified hex data, the application 120 may generate the hex files 118 including hex data compatible with the application 120 and hex data translated to a form compatible with the LoadRunner application 114. For example, the hex files 118 can include hex data in ASCII and a translation of the hex data to a EBCDIC format.

In regards to generating LoadRunner scripts, a user may update the variable files 116 indicating transactions to execute with the mainframe 102 through the MQSeries queues 112. For example, the user may request that a plurality of credit increases be performed on a plurality of user accounts. In response to at least the updates, the application 120 may identify the updated variable file 116 and one or more associated hex files 118. The application 120 may map the application variables with variables compatible with the LoadRunner application 114 and hex data in the hex file 118 associated with the variables. Based at least in part, on the LoadRunner variables and the associated hex data, the application 120 may automatically generate a LoadRunner script 122 that generates MQSeries messages for executing transactions with the applications 110. In some implementations, the application 120 may map COBOL variables of the application 110 to C variables based, at least in part, on the variable file 116. In addition, the applications 122 may identify EBCDIC hex data for initializing certain C parameters based, at least in part, on the hex file 118. Based, at least in part, on the translated variables and the EBCDIC hex data, the application 122 may generate a LoadRunner script 122 that generates MQSeries transactions that evaluates performances of the applications 110. During executing of the LoadRunner script 122, the LoadRunner 114 may generates MQSeries messages and transmits the messages to the MQSeries queue 112. The executed LoadRunner script 122 may evaluate responses from the applications 110 and generate one or more reports 124.

As mentioned above, the system 100 includes, invokes, executes, references, or is communicably coupled with the mainframe 102. A mainframe 102 can include any software, hardware, and/or firmware configured to execute transactions with the MQSeries system 104. For example, the mainframe 102 may be a computing device that executes transactions from thousands of users such as, for example, financial transactions (e.g., ATM transactions). In this example, the mainframe 102 may support hundreds or thousands of users simultaneously. Typically, the mainframe 102 can be used by large, complex organizations (e.g., financial institutions) to continuously sustain many simultaneous transactions and/or communicate with a plurality of devices. The script generator 120 may create a set of transactions that duplicates a real users actions that can executed many times concurrently to duplicate loads and stress of the real world utilizations. In some implementations, the mainframe 102 may be a computer from or otherwise compatible with the IBM System/360 line (e.g., IBM System z10). In some implementations, the mainframe 102 includes or is otherwise associated with one or more databases (not illustrated) accessed through, for example, EBCDIC hex messages. In the illustrated implementation, the mainframe 102 can execute the applications 110a-c at any appropriate time such as, for example, in response to a request or input from the MQSeries system 104 or any appropriate computer system coupled with network 108. The application 110 is any suitable application software running on the mainframe 102 such as any general application that process bulk transactions. For example, the applications 110a-c may support a plurality of users (e.g., thousands) submitting a plurality of transactions (e.g., millions of transactions per day). In some implementations, a financial institution (not illustrated) may use the applications 110a-c to processes transactions associated with financial instruments (e.g., credit cards, checks). In some implementations, the applications 110 may execute one or more of the following: receive hex data from the MQSeries system 104 encoding one or more transaction requests; execute the transactions in accordance with the requests; transmit hex data to the MQSeries system 104 encoding responses to the transaction requests; and/or other operations. The applications 110a-c may be based on any suitable programming language such as COBOL. In this example, PICS information for the COBOL applications 110a-c may be provided to the client 106. The PICS information may identify one or more of the following: send variables, receive variables, types, variable sizes, and/or other information associated with the operation of the application 110.

The MQSeries system 104 can include any hardware, software, and/or firmware configured to manage messages transmitted to and/or received from the mainframe 102. For example, the MQSeries system 104 may queue transaction requests for and response from the mainframe 102. In some implementations, the MQSeries system 104 can manage messaging across multiple platforms such as Windows, Linux, IBM mainframe and midrange, Unix and/or others. In some implementations, the MQSeries system 104 can be an International Business Machines (IBM) WebSphere MQ system. In the illustrated implementation, the MQSeries system 104 includes a send queue 112a and a receive queue 112b. The send queue 112a can include memory for queuing transaction requests transmitted to the mainframe 102. For example, the send queue 112a may be a First In and a First Out (FIFO) queue. In some implementations, the MQSeries system 104 can receive MQSeries messages including hex data, filter out the hex data compatible with the application 110, and queue the filtered hex data in the send queue 112a. The receive queue 112a may similarly include memory for storing messages received from the application 110 and transmitting the hex data to the client 106 in accordance with a queuing protocol (e.g., FIFO). The queue 112 may queue messages in any form such as binary and/or character data (e.g., ASCII, EBCDIC) that are processable by the applications 110. In some implementations, the MQSeries system 104 may update messages with storage, routing, and/or delivery information prior transmission and remove from the message prior to delivery to the receiving application 110. The possible variations to the script application 120 may process a plurality of types of information that may be translated and transported from the client 106 to the mainframe 102 and received back again to the client 106.

The client 106 is any devices (e.g., computing devices) operable to connect or communicate with the network 108 using any communication link. The client 106 includes, executes, or otherwise presents a GUI 126 and comprises an electronic device operable to receive, transmit, process and store any appropriate data associated with system 100. While the illustrated implementation includes the client 106, the system 100 may include any number of clients 106 communicably coupled to the network 108. Further, "client 106" and "user" may be used interchangeably as appropriate. Moreover, for ease of illustration, the client 106 is described in terms of being used by one user. But many users may use one device or that one user may use multiple devices.

As used in this disclosure, a user of client 106 is any person, department, organization, small business, enterprise, or any other entity that may use or request others to use system 100. Client 106 is intended to encompass a personal computer, touch screen terminal, workstation, network computer, kiosk, wireless data port, smart phone, personal data assistant (PDA), one or more processors within these or other devices, or any other suitable processing or electronic device used by a user viewing content from the network 108. For example, the client 106 may be a PDA operable to wirelessly connect with an external or unsecured network. In another example, the client 106 may comprise a laptop that includes an input device, such as a keypad, touch screen, mouse, or other device that can accept information, and an output device that conveys information associated with evaluation data of the mainframe, including digital data, visual information, or GUI 126. Both the input device and output device may include fixed or removable storage media such as a magnetic computer disk, CD-ROM, or other suitable media to both receive input from and provide output to users of the client 106 through the display, namely the client portion of GUI 126.

The GUI 126 comprises a graphical user interface operable to allow the user of the client 106 to interface with at least a portion of the system 100 for any suitable purpose, such as presenting evaluation reports 124. Generally, the GUI 126 provides the particular user with an efficient and user-friendly presentation of data provided by or communicated within system 100. The GUI 126 may comprise a plurality of customizable frames or views having interactive fields, pull-down lists, and buttons operated by the user. For example, the GUI 126 may be operable to display certain reports 124 in a user-friendly form based on the user context and the displayed data. The GUI 126 can be configurable, supporting a combination of graphical elements (e.g., fields, buttons), to present the user interface of the application 120 and/or the reports 124. The term graphical user interface may be used in the singular or in the plural to describe one or more graphical user interfaces and each of the displays of a particular graphical user interface. The GUI 126 may be any graphical user interface, such as a generic web browser or touch screen, that processes information in the system 100 and efficiently presents the results to the user.

In the illustrated implementation, the client 106 includes the LoadRunner application 114, the variable files 116, the hex files 118, the script application 120, the LoadRunner script 122, and the reports 124. The LoadRunner application 114 is a software application currently distributed by HP that evaluates and/or predicts behavior and performance of systems, which was previously distributed by Mercury Interactive. For example, the LoadRunner application 114 may evaluate response times, number of transactions handled, load from transactions, and/or other aspects of systems. The LoadRunner application 114 includes the following tools: a Virtual User Generator (VuGen) to capture end-user business processes and generate a performance testing script; a controller to organize, drive, manage, and/or monitor load tests; load generators to generate the load by running virtual users; an analysis to view, dissect, and compare performance results; a launcher to provide an access point for the user of the LoadRunner application 114; and others. In some implementations, the LoadRunner application 114 can emulate hundreds or thousands of concurrent users to apply production workloads to systems while identifying performances of key elements in the system being evaluated.

The variable files 116 comprises instructions, mappings, data entries, and/or any other information or directive used by the application 120 to generate the LoadRunner script 122. For examples, the variable file 116 may map variables compatible with the application 110 (e.g., COBOL variables) to variables compatible with the LoadRunner application 114 (e.g., C variables). In some implementations, the variable files 116 may include or otherwise identify one or more of the following: application variables; LoadRunner variables; types; size; values for tested variables; verbs identifying processes; nouns identifying parameters used with the verbs; validation points; error codes; usage (e.g., iterate); variable names; queue parameters; and/or others. The verbs may be entered to request for additional coding added to the script 122 associated to the specific variable. The verbs may be actions like conversions of data from one format to another, comparisons of variables to specific knows status values, adding code to do mathematical operations on a variable or deriving new data from a completed MQ-Series call to form another MQ-Series call, and/or other processes. Each may be accompanied with any number of nouns or parameters to build the additional code based on properly formed C-code syntax. In some implementations, the variable file 116 may map a single variable to multiple variables of a different programming language. For example, the variable file 116 may map a single COBOL variable to one or more C variables. In some implementations, the variable 116 may include a first verb indicating a first send process (e.g., current credit limit query) and a second verb indicating a second process using information generated from the first processes (e.g., incrementing the credit limit). The variable file 116 may include one or more validation points for receive variables. For example, the validation point may be used by the application 120 to determine whether values returned by the mainframe 102 include errors. For example, the validation point may include a range, a threshold, and/or other values used to verify a received value. The variable file 116 may be associated with send variables, receive variables, and/or a combination of the foregoing. The variable file 116 may be any suitable format such as, for example, an Excel document, an Extensible Markup Language (XML) document, a flat file, Comma-Separated-Value (CSV) file, a name-value pair file, a Structured Query Language (SQL) table, an array, an object, or others. The variable file 116 may be any suitable data structure such as an array, matrix, list, table, or any other suitable structure that maps a variables compatible with the application 110 to variables compatible with the LoadRunner application 114. The variable file 116 may be dynamically created or populated by the client 106, a third-party vendor, any suitable user of the client 106, loaded from a default file, or received via network 108. The term "dynamically" as used herein, generally means that the appropriate processing is determined at run-time based upon the appropriate information.

The hex files 118 includes one or more data entries or structures that maps hex data between different variables. For example, the hex file 118 may include hex data for a specific variable in ASCII and the hex data in EBCDIC. As previously mentioned, the hex file 118 may be based, at least in part, on hex data identified in the MQSeries system 104 during an MQSeries transaction. In other words, the hex file 118 may include hex data processable by the MQSeries system 104 and/or the mainframe 102. In some implementations, the hex file 118 may include one or more of the following: hex data in one of a plurality of selectable COBOL formats (e.g., EBCDIC, COMP3, COMP), indices, and/or others. The indexes may generate a traceable relationship between the actual MQ hex data sent or received with the actual send or received variables that are generated in the scripts nibble by nibble (e.g., ½ byte, 4 bits). The hex file 118 may be any suitable format such as, for example, an XML document, a flat file, CSV file, a name-value pair file, SQL table, an array, an object, or others. In some implementations, The hex file 118 is a matrix of ASCII hex data and EBCDIC hex data. The hex file 118 may be dynamically created by the client 106, by a third-party vendor, or any suitable user of the client 106, loaded from a default file, or received via network 108.

The script application 120 can include any software, hardware, and/or firmware configured to automatically generate the LoadRunner script 122. For example, the script application 120 may automatically generate a LoadRunner script based, at least in part, on the variable file 116 and the hex file 118. In some implementations, the script application 120 may execute one or more of the following: receive a request from a user to generate the LoadRunner script 122; identify one or more variable files 116 associated with the request; identify one or more variables selected by the user for execution; map the selected variables to one or more variables compatible with the LoadRunner application 114 using the variable file 116; generate a structure of the requested script 122 including an init, action and end section; populate the script 122 with the LoadRunner variables identified in the variable file 116; identify hex data associated with the variables in the hex file 118; initialize the variables with the identified hex data; pass the script to the LoadRunner application 114 for naming; and/or other processes. In some implementations, the application 120 may receive a selection through the GUI 126 indicating a request to automatically generate the LoadRunner script 122. The application 120 may automatically generate the script 122 in response to at least the user updating a variable file 116. The application 120 may identify one or more variable files 116 based, at least in part, on one or more parameters such as a user, a client 106, a mainframe 102, an application 110, and/or other aspect of the system 100. In some implementations, the client 106 can include a variable file 116 for send variables and a different variable file 116 for receive variables such that the application 120 identifies only these two files 116. The application 120 may identify one or more variables in the variable file 116 including values assigned to associated parameters and generate the script 122 to execute one or more processes based, at least in part, on the variables and values. In some implementations, the application 120 may identify a verb-noun structure in the variable file 116 defining one or more processes based on variables and values. In connection with populating the script 122 with variables and values, the application 120 may automatically identify one or more hex files 118 associated with the variables. For example, the application 120 may initialize one or more variables with associated hex data included in the identified hex file 118.

The LoadRunner script 122 can include a script processable by the LoadRunner application 114 that generates MQSeries transactions. For example, the script 122 may be any suitable language processable by the LoadRunner application 114 such as C. In addition, the script 122 may include hex data in any suitable format processable by the application 114 such as ASCII. In some implementations, the script 122 can include three sections such as an initialization, action and validation section. During execution, the initialization section may initialize the variables, the action section may execute one or more transactions, and the validation section may validate values returned by the applications 110. In regards to initialization, the executed script 122 may identify hex values in the hex file 118 and populate variables with initial values including the identified hex data. In some implementations, the executed script 122 may convert ASCII hex data in the script to EBCDIC hex data in the MQSeries transactions. In regards to the action section, the executed script 122 may generate one or more commands compatible with the application 110 such that the commands execute one or more transactions. For example, the executed script 122 may generate a request to check a credit limit in a specific bank account such that the request is compatible with the application 110. As for the validation section, the executed script 122 may include validation points to verify values received from the application 110. The validation points may include a range, an upper threshold, a lower threshold, other values, and/or mathematical and/or logical expressions. For example, the executed script 122 may verify that a returned value is within a range. In response to at least determining a violation of a validation point, the executed script 122 may generate an error code identifying the specific error in the returned value.

Based, at least in part on evaluation data, reports 124 include one or more entries or data structures that identifies information associated with tracking the performance of the mainframe 102 and/or applications 110. For example, the report 124 may identify executed transactions, response times, error codes and/or other data for displaying through GUI 126. In some implementations, the report 124 may be based on or otherwise associated with one or more of the following criteria: a specific transaction, a specific application 110, the mainframe 102, a specific emulated user, virtual user iteration results code of the MQ-Series request, and/or other information. In some implementations, the report 124 can include aggregated transaction numbers and response times for display through the GUI 126. The results array per each virtual user per each iteration may create a set of files for a specific performance test that can be used to generate graphs of the tests results.

In one aspect of operation, the script application 120 may generate one or more variable files 116 based, at least in part, on technical information of the applications 110. In addition, the variable files 116 may include variables compatible with the LoadRunner application 114 that are mapped to the mainframe variables. The script application 120 may transmit MQSeries transactions to the MQSeries system 104 and identify hex data for send and receive data in the MQSeries queues 112. Based, at least in part, the script application 120 may generate one or more hex files 118 based, at least in part, on the hex data identified in the queues 112. In response to an event (e.g., request), the script application 120 may identify one or more variable files 116 and hex files 118. In addition, the script application 120 may identify one or more selected variables in the variable files 116 for executing transactions with the application 110. Based, at least in part, on the identified variables and corresponding hex data, the script application 120 may automatically generate the LoadRunner script 122 that executes one or more MQSeries transactions with the mainframe 102.

FIGS. 2-9 are flowcharts illustrating example methods 200, 300, 400, 500, 600, 700, 800, and 900 for generating a LoadRunner script in accordance with some implementations of the present disclosure. Generally, the methods describe example techniques for generating variable files and hex files and automatically generating LoadRunner script files based, at least in part, on the variable files and the hex files. The methods may be implemented using any appropriate combination and arrangement of logical elements implementing some or all of the described functionality.

Figure 2:
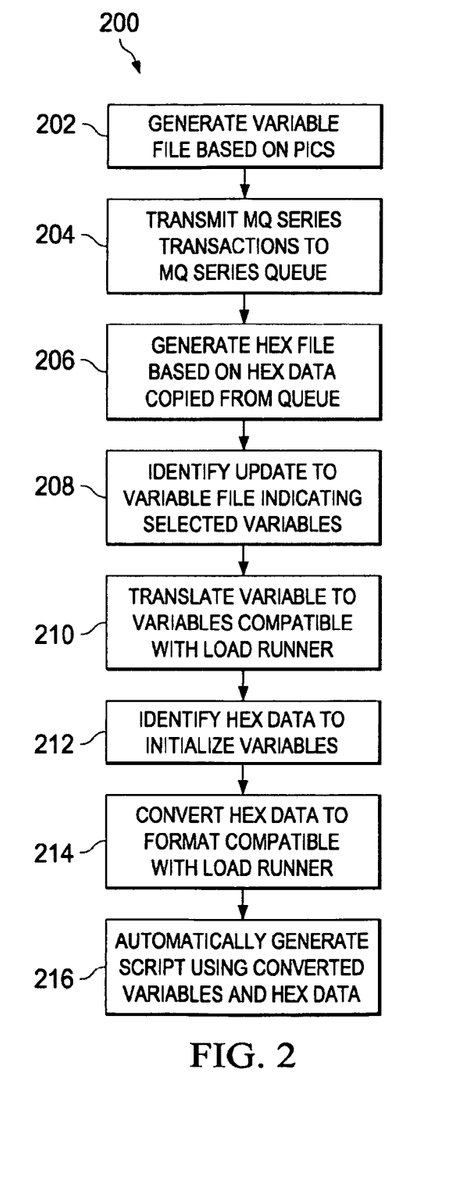
FIG. 2 is a flow diagram illustrating an example method for generating LoadRunner scripts.

Referring to FIG. 2, the method 200 begins at step 202 where a variable file is generated based, at least in part, on PICS. For example, the script application 120 of FIG. 1 may generate a send variable file 116 and a receive variable file 116 using PICS. At step 204, MQSeries transactions are transmitted to an MQSeries system to determine hex data for each transaction. Next, at step 206, a hex file is generated based, at least in part, on hex data copied from the MQSeries queues. In the example, the application 120 may copy hex data from the MQSeries queues 112 and generate one or more hex files 118 based, at least in part, on the copied data. An update to the variable file indicating one or more selected variables is identified at step 208. For example, a user may update variables in the variable file 116 to iteratively execute one or more processes. At step 210, the selected variables are translated to variables compatible with the LoadRunner application. For example, the variable file 116 may translate between commands compatible with the mainframe 102 and commands compatible with the LoadRunner application 114. Next, at step 212, hex data for initializing variables is identified. Returning to the example, the application 120 may identify hex data in the hex file 118 associated with initializing variables. At step 214, the hex data is converted from a format compatible with the mainframe to a format compatible with the LoadRunner application. For example, the application 120 may convert between EBCDIC and ASCII based, at least in part, on the hex file 118. A LoadRunner script is automatically generated based, at least in part, on the converted variables and hex data at step 216.

Figure 3:
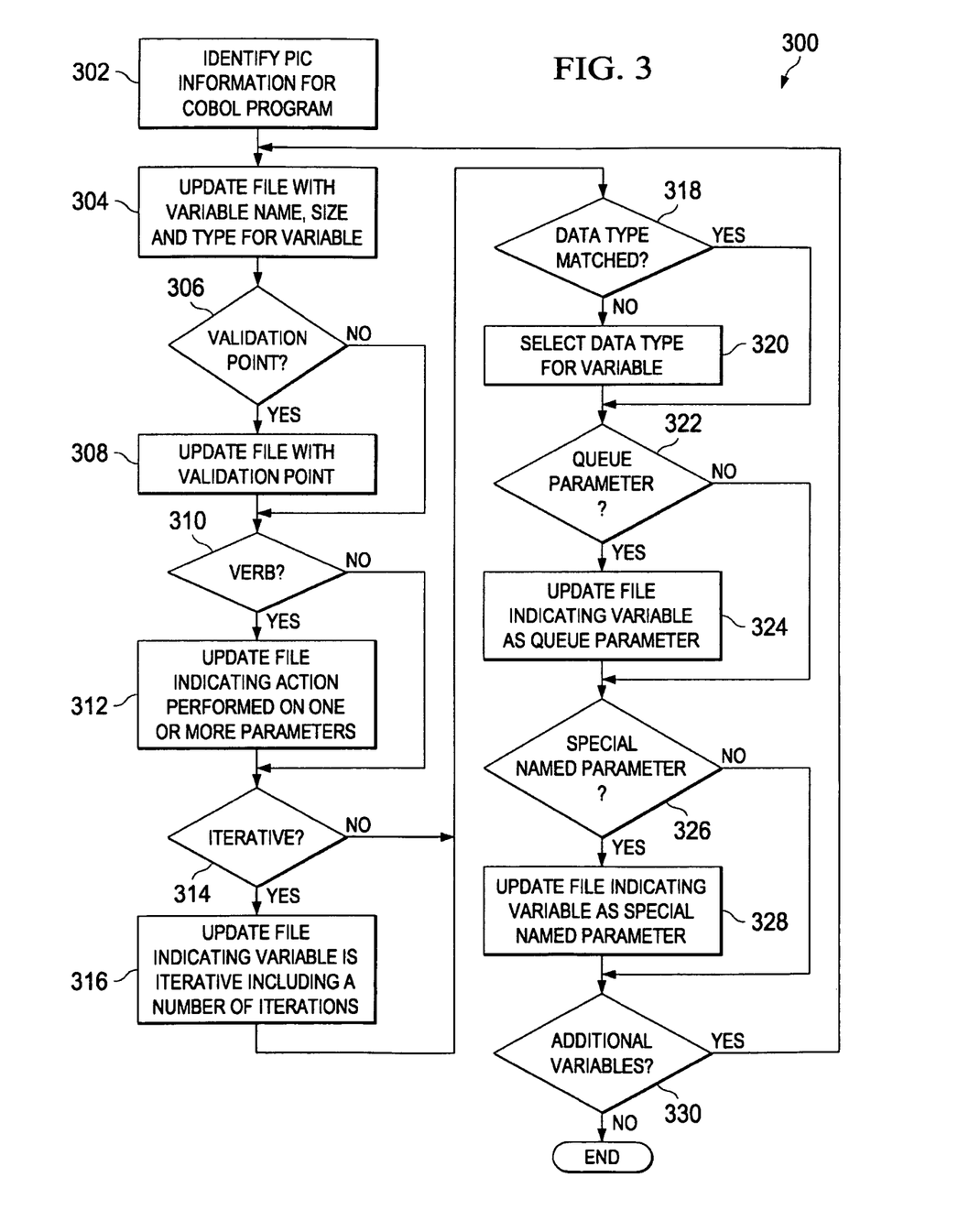
FIG. 3 is a flow diagram illustrating an example method for generating variable files.

Referring to FIG. 3, method 300 begins at step 302 where PICS information for a COBOL program executed by a mainframe is identified. For example, the client 106 of FIG. 1 may receive a technical specification for the application 110 and identify PICS information for the variables processed by the application 110. At step 304, a file is updated with the variable name, size, and type based, at least in part, on the identified PICS information. In the example, the client 106 may update a send variable file 116 and/or a receive variable file 116 with a variable name, size and type. If a validation point is included with the variable at decisional step 306, then, at step 308, the associated file is updated with the validation point. Again in the example, the client 106 may update the send variable file 116 and/or the receive variable file 116 with a validation point ranging from a first number to a second number. If the variable does not include a validation point at decisional step 306, then execution proceeds to decisional step 310. If the variable includes one or more verbs, then, at step 312, the associated file is updated with one or more command statements including one or more parameters operating on the command statements. For example, the client 106 may update the variable file 116 with command statements to operate one or more processes on one or more parameters. If the variable does not include a verb at decisional step 310, then execution proceeds to decisional step 314. If the variable is executed iteratively, then, at step 316, the associated file is updated to indicate that the variable is iteratively executed for a specified number of executions. If the variable is not iterative at decisional step 314, then execution proceeds to decisional step 318. If the variable does not include a data type matched, then, at step 320, a data type for the variable is selected. Returning to the example, the client 106 may select a data type from a plurality of selectable types and update the file 116 with the selected data type. If the data type is matched at decisional step 318, then execute proceeds to decisional step 322. If the variable is a queue parameter, then, at step 324, the associated file is updated to indicate the variable as a queue parameter. Again in the example, the client 106 may update the file 116 to indicate the variable as a queue parameter. If the variable is not a queue parameter at decisional step 322, then execution proceeds to decisional step 326. If the variable is a special named parameter, then, at step 328, the associated file is updated to indicated the variable as a special named parameter. Again in the example, the client 106 may update the file 116 to indicate the variable as a special named parameter. If the additional variables are identified from the PICS information at decisional step 330, then execution returns to step 304. If no additional variables are identified, then execution ends.

Figure 4:
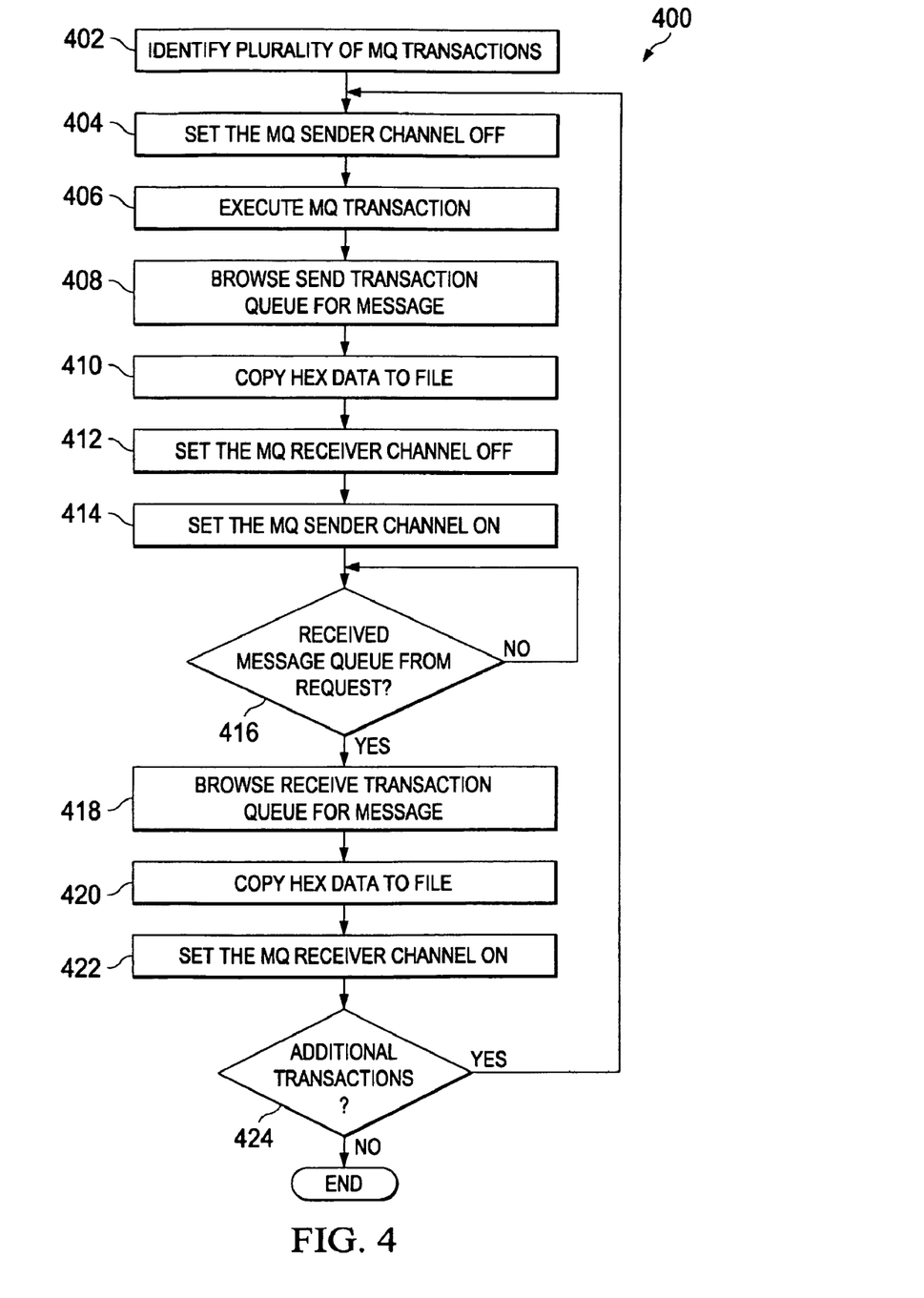
FIG. 4 is a flow diagram illustrating an example method for generating hexadecimal files.

Referring to FIG. 4, the method 400 begins at step 402 where a plurality of MQ transactions are identified. At step 404, an MQ sender channel of an MQSeries queue is set to off. For example, the client 106 in FIG. 1 may transmit a command to the MQSeries system 104 to switch at least one sender channel to the mainframe 102 to off. Next, at step 406, an MQ transaction is executed. In the example, the client 106 executes an MQSeries transaction with the MQSeries system 104. The send transaction queue is browsed to identify the hex data for the message at step 408. Again in the example, the client 106 may browse the hex data in the MQSeries queue to identify the hex data associated with the executed transaction. At step 410, the hex data associated with the send message is copied to a file. As for the example, the client 106 may update the file 118 with the hex data identified as the MQ send message for the executed transaction. Next, at step 412, the MQ receiver channel is set to off, and at step 414, the MQ sender channel is set to on. Again in the example, the client 106 may switch the sender channel to the mainframe 102 on and switch the receiver channel from the mainframe 102 to off. If the received message associated with the executed transaction is received by the message queue at decisional step 416, then, at step 418, the receive transaction queue is browsed to identify the hex data of the received message. If the received message associated with the executed transaction is not received by the message queue, then execution return to the decisional step 416. At step 420, the hex data associated with the received message is copied to a file associated with the MQ transaction. Next, at step 422, the MQ receiver channel is set to on. If additional MQ transactions are available at decisional step 424, then execution returns to step 404. If no additional MQ transactions are available, then execution ends.

Figure 5:
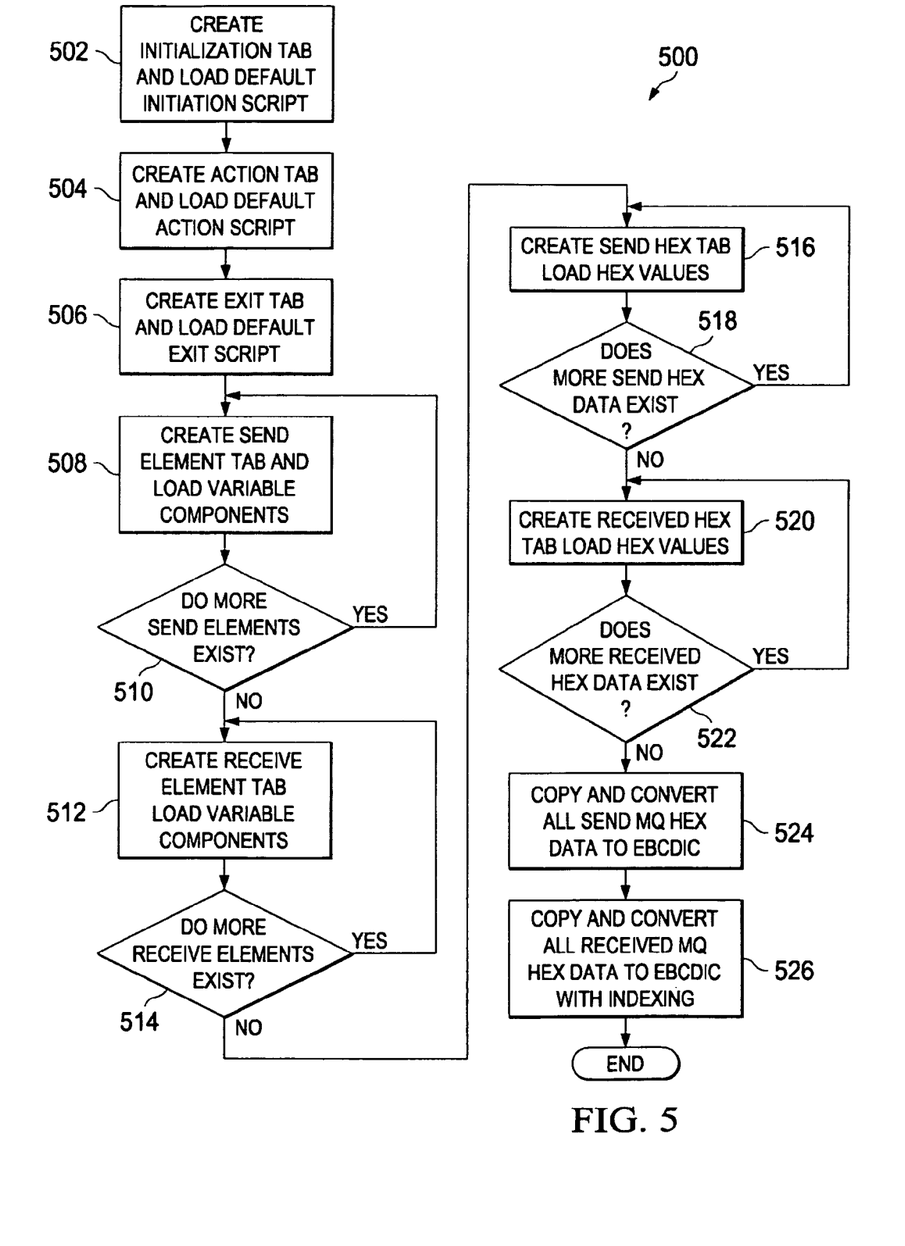
FIG. 5, is a flow diagram illustrating an example method for generating a default script structure.

Referring to FIG. 5, the method 500 begins at step 502 where an init tab is generated and default initiation script is loaded. Next, at step 504, an action tab is generated and default action script is loaded. At step 506, an exit tab is generated and default exit script is loaded. A send element is generated and variable components for the element are loaded at step 508. If additional send elements exist at decisional step 510, then execution returns to step 508. If no additional send elements exist, then a receive element is generated and associated variable components are loaded at step 512. If additional receive elements exist at decisional step 514, then execution returns to step 512. If no additional receive elements exist, then a send hex tab is generated and hex values are loaded at step 516. If additional send hex data exist at decisional step 518, then execution returns to step 516. If no additional send hex data exist at decisional, then a received hex tab is generated and hex values are loaded at step 520. If additional received hex data exist at decisional step 522, then execution returns to step 520. If no additional received data exist, then the send MQ hex data is converted to EBCDIC at step 524 and the received MQ hex data is converted to EBCDIC with indexing at step 526.

Figure 6:
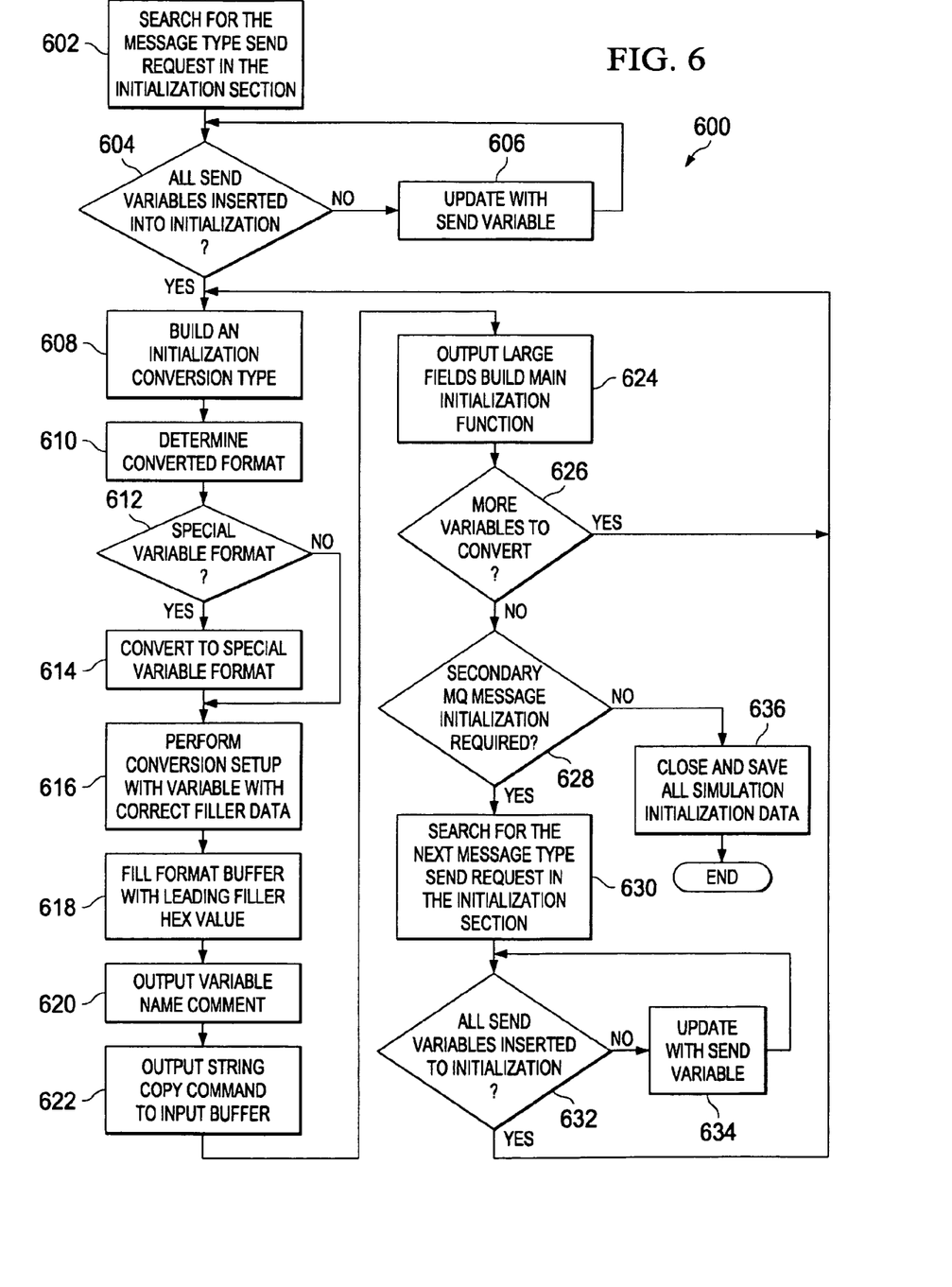
FIG. 6 is a flow diagram illustrating an example method for generating an initialization section of a LoadRunner script.

Referring to FIG. 6, the method 600 begins at step 602 where send-request message types are searched for in the Init section of the LoadRunner script. If all send variables are not inserted in the init section at decisional step 604, then, at step 606, the init section is updated with an additional send variable. If all additional send variables are inserted, then, at step 608, an init conversion type is generated for a send variable. Next, at step 610, the format for converting the variable is determined such as, for example, EBCDIC, ASCII, COMP3, COMP signed, COMP unsigned, special variable format, and/or other formats. If the converted format is a special format at decisional step 612, then the variable is converted to a special variable format at step 614. Next, at step 616, conversion setup for variable with correct filler data is executed. At step 618, the format buffer is updated with the leading filler hex value. The portion of the init section for the variable is updated with output variable name comment at step 620. At step 622, the associated script portion is updated with an output string for a copy command to an input buffer. Next, at step 624, the associate script portion is updated with a command to output large fields to build main init functions. If one or more variables are available for conversion at decisional step 626, then execution returns to step 608. If there are no additional variables, then execution proceeds to decisional step 628. If a secondary MQ initialization message is required at decisional step 628, then the next message type send request in the init section is searched for at step 630. If additional send variables are available at decisional step 632, then the init section is updated with an additional send variable at step 634. If no additional send variables are available, then execution returns to step 608. Returning to decisional step 628, if no secondary MQ messages are required, then the simulation initialization date is closed and saved at step 636.

Figure 7A:
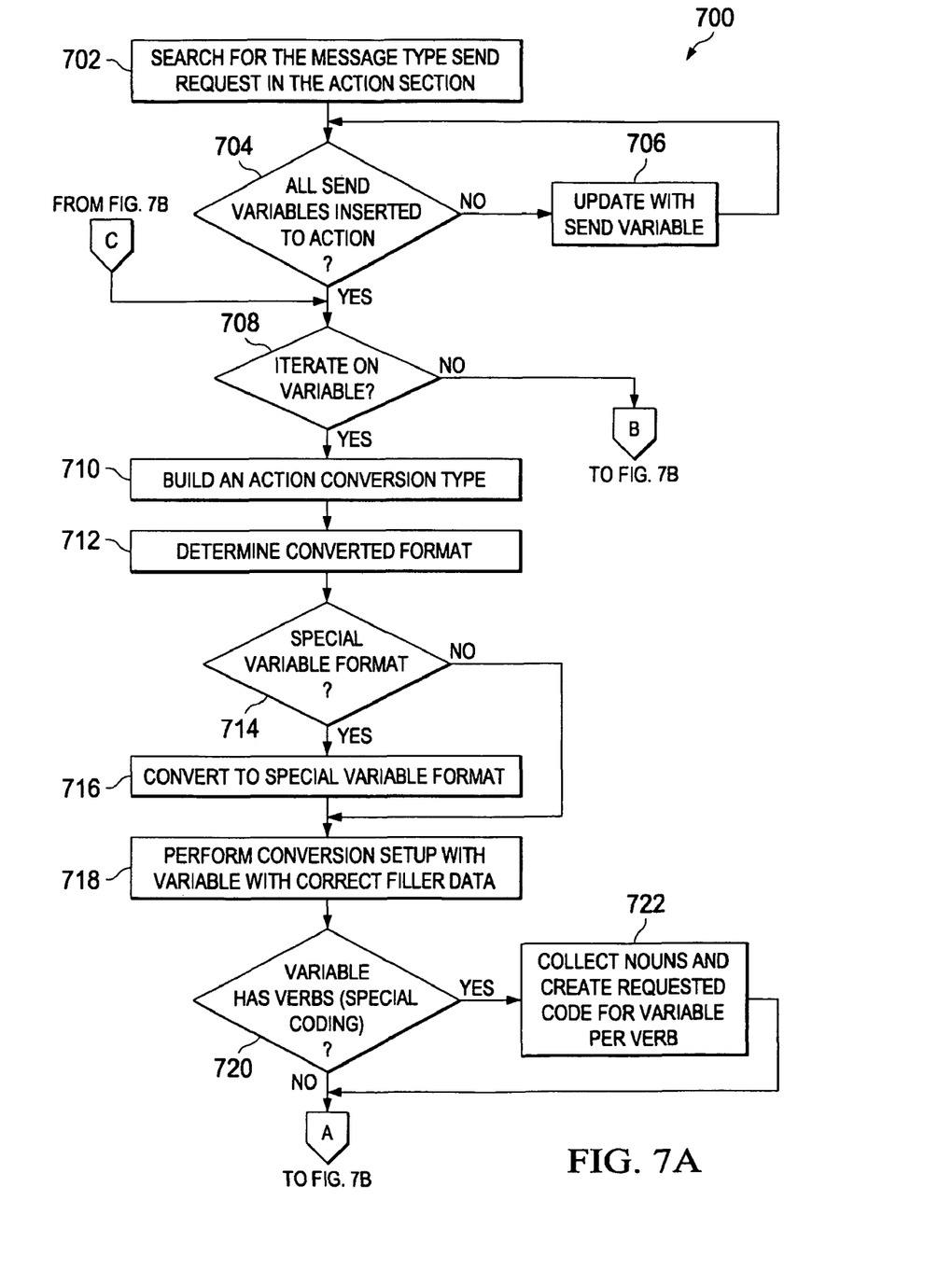
FIGS. 7A and 7B are a flow diagrams illustrating an example method for generating an action section of a LoadRunner script.
Figure 7B:
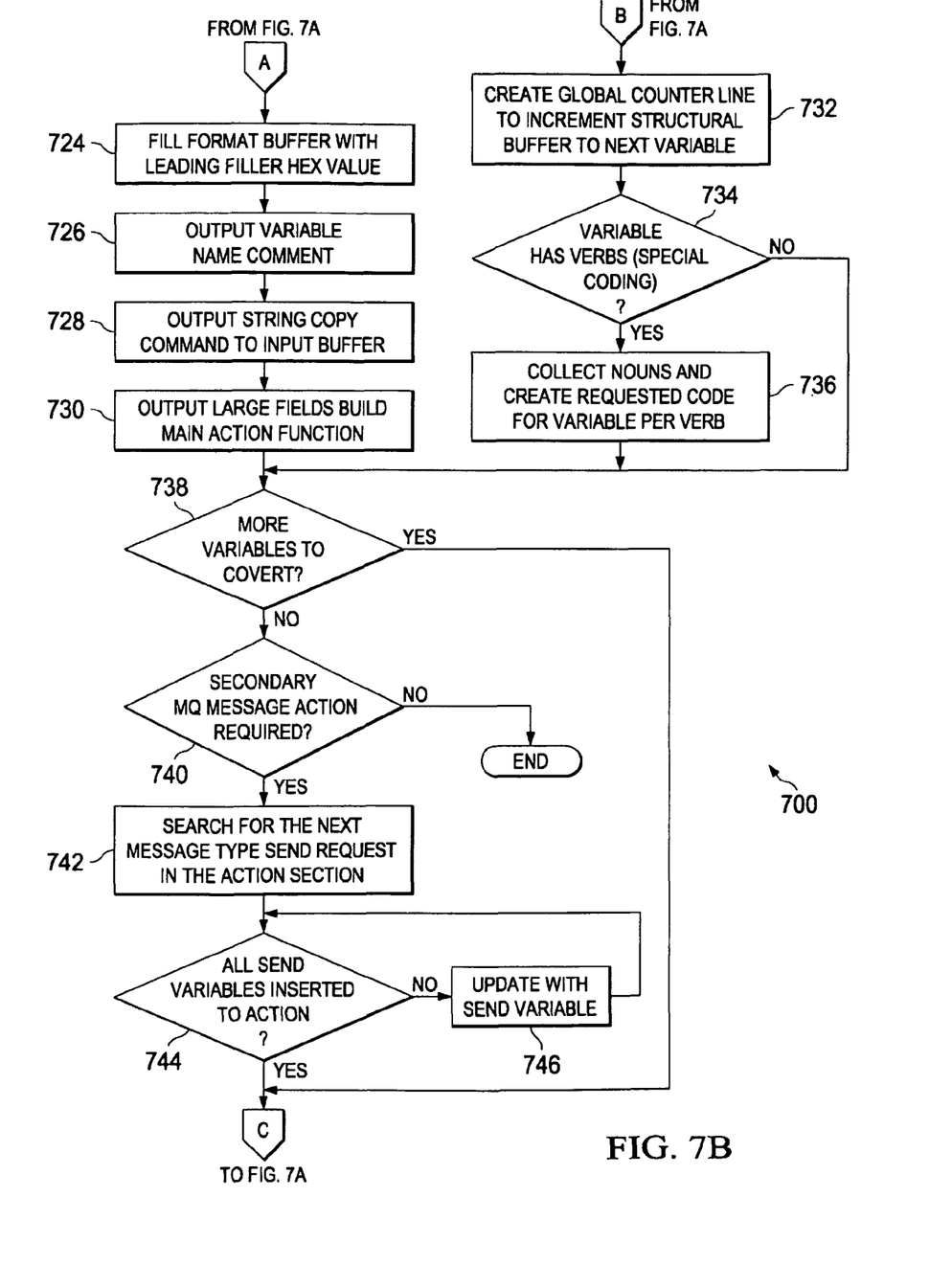

Referring to FIGS. 7A and 7B, method 700 begins at step 702 where at step 702 where send-request message types are searched for in the action section of the LoadRunner script. If all send variables are not inserted in the init section at decisional step 704, then, at step 706, the action section is updated with an additional send variable. If all additional send variables are inserted, then execution proceeds to decisional step 708. If the variable is iterated a specified number of times, then, at step 710, an action conversion type is generated. Next, at step 712, the format for converting the variable is determined such as, for example, EBCDIC, ASCII, COMP3, COMP signed, COMP unsigned, special variable format, and/or other formats. If the converted format is a special format at decisional step 714, then the variable is converted to a special variable format at step 716. Next, at step 718, conversion setup for variable with correct filler data is executed. If variable includes verbs at decisional step 720, then, at step 722, the associated nouns are generated and the requested code for the variable for each verb is generated based, at least in part, on the nouns. In the variable does not include one or more verbs, then execution proceeds to step 724 where the format buffer is filled with the leading filler hex value. Next, at step 726, the portion of the action section for the variable is updated with an output variable name comment. At step 728, the associated script portion is updated with an output string for a copy command to an input buffer. Next, at step 730, the associate script portion is updated with a command to output large fields to build main an action function. Returning to decisional step 708, if the variable is not iterative, then, at step 732, a global counter line is generated to increment the structured buffer to next variable. If the variable includes verbs at decisional step 734, then, at step 736, associated nouns are generated and the requested code for the variable for the verb is generated based, at least in part, on the associated nouns. If the variable does not include a verb, then execution proceeds to decisional step 738. If additional variables are available to convert, then execution returns to decisional step 708. If no additional variables are available, then execution proceeds to decision step 740. If a secondary MQ action message is required at decisional step 740, then the next message type send request in the action section is searched for at step 742. If additional send variables are available at decisional step 744, then the action section is updated with an additional send variable at step 746. If no additional send variables are available, then execution returns to decisional step 708. Returning to decisional step 740, if no secondary MQ messages are required, then execution ends.

Figure 8A:
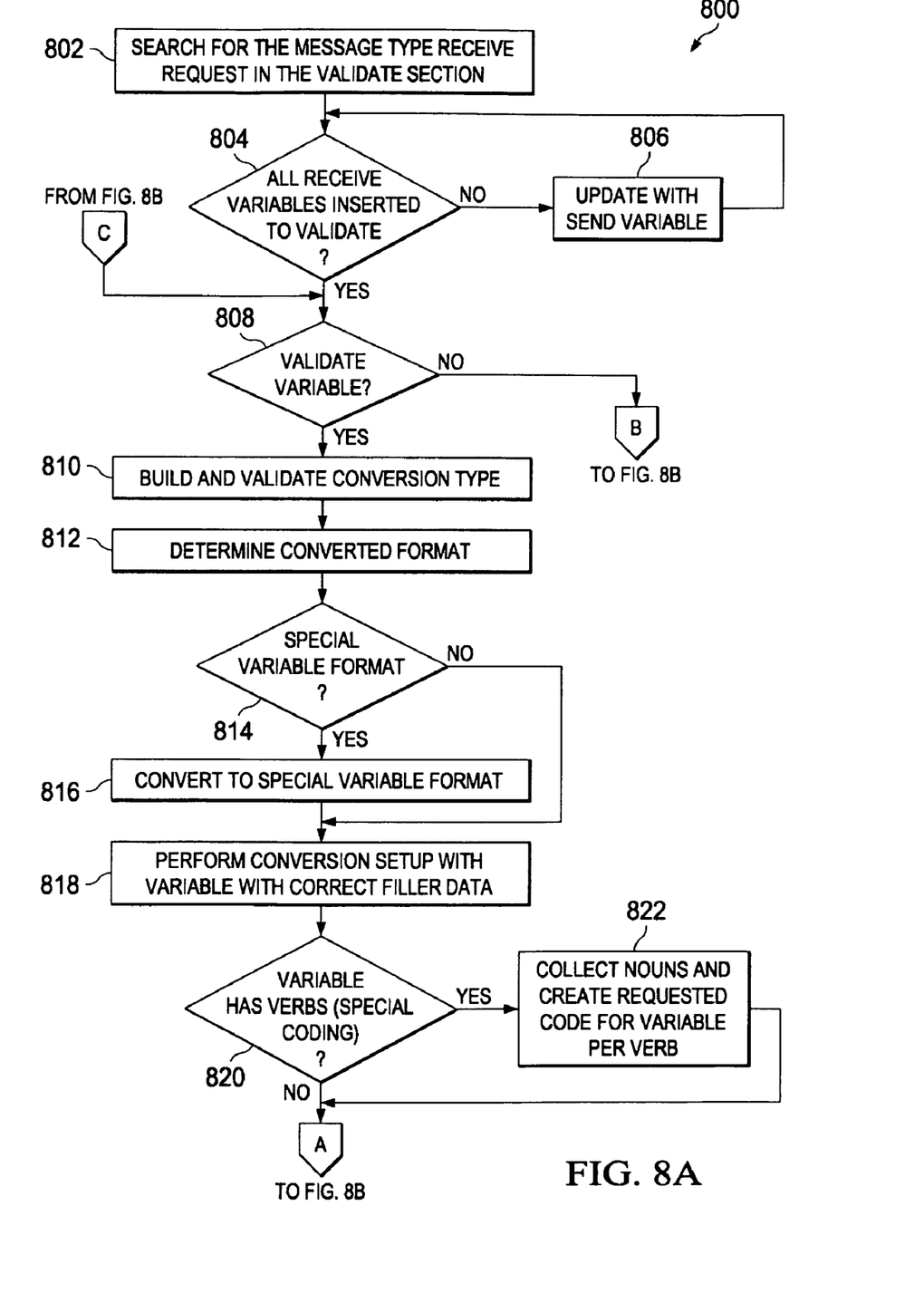
FIGS. 8A and 8B are a flow diagrams illustrating an example method for generating an validation section of a LoadRunner script.
Figure 8B:
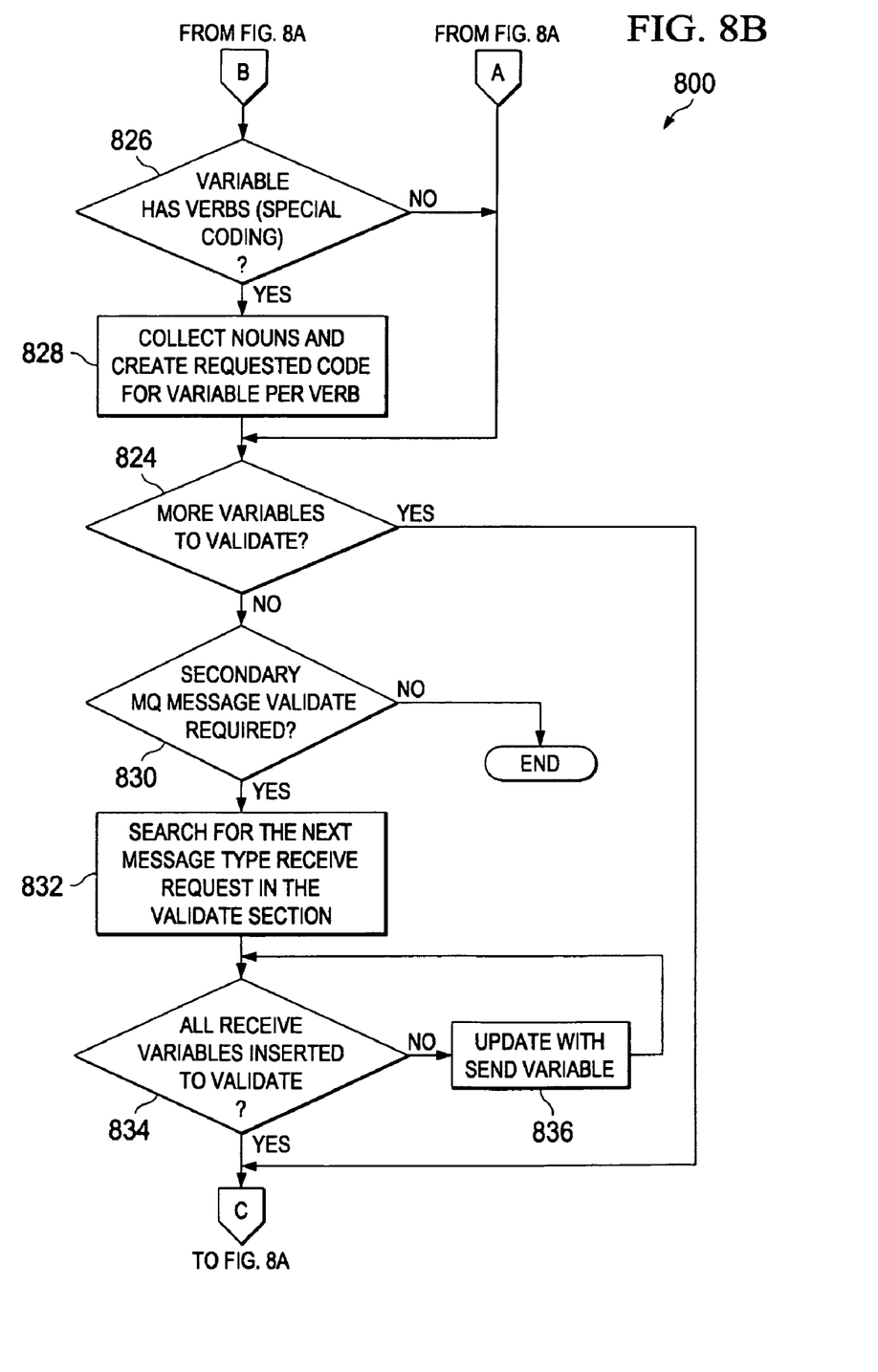

Referring to FIGS. 8A and 8B, method 800 begins at step 802 where send-request message types are searched for in the validation section of the LoadRunner script. If all send variables are not inserted in the init section at decisional step 804, then, at step 806, the action section is updated with an additional send variable. If all additional send variables are inserted, then execution proceeds to decisional step 808. If the variable includes a validation point, then, at step 810, a validation conversion type is generated. Next, at step 812, the format for converting the variable is determined such as, for example, EBCDIC, ASCII, COMP3, COMP signed, COMP unsigned, special variable format, and/or other formats. If the converted format is a special format at decisional step 814, then the variable is converted to a special variable format at step 816. Next, at step 818, conversion setup for variable with correct filler data is executed. If variable includes verbs at decisional step 820, then, at step 822, the associated nouns are generated and the requested code for the variable for each verb is generated based, at least in part, on the nouns. If the variable does not include one or more verbs, then execution proceeds to decisional step 824. Returning to decisional step 808, if the variable does not include a validation point, then execution proceeds to decisional step 826. If the variable includes verbs, then, at step 828, associated nouns are generated and the requested code for the variable for the verb is generated based, at least in part, on the associated nouns. If the variable does not include a verb, then execution proceeds to decisional step 824. If additional variables are available to convert, then execution returns to decisional step 808. If no additional variables are available, then execution proceeds to decision step 830. If a secondary MQ action message is required, then the next message type send request in the action section is searched for at step 832. If additional send variables are available at decisional step 834, then the action section is updated with an additional send variable at step 836. If no additional send variables are available, then execution returns to decisional step 808. Returning to decisional step 830, if no secondary MQ messages are required, then execution ends.

Figure 9:
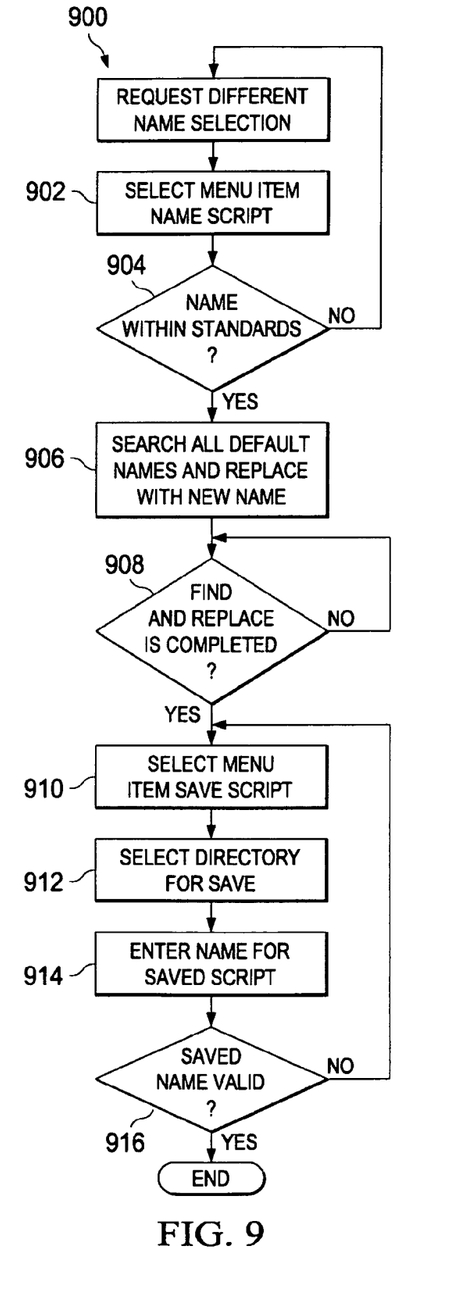
FIG. 9 is a flow diagram illustrating an example method for naming a LoadRunner script.

Referring to FIG. 9, method 900 begins at step 902 where a menu item name script is selected. If the name is not within standards at decisional step 904, then, at step 906, the user is prompted to select a different name and execute returns to step 902. If the name is within standards at decisional step 904, the default names are searched and updated with the new name. If the replacements are complete at decisional step 908, then the menu item save script is selected at step 910. Next, at step 912, a directory for the save location is selected. A name for the saved script is entered at step 914. If the saved name is not valid at decisional step 916, then execution returns to step 910. If the name is valid, then execution ends.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal that is generated to encode information for transmission to suitable receiver apparatus for execution by a computer. The computer readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:
1. A method, comprising:
receiving a request to execute one or more transactions with a COBOL application of a mainframe to evaluate one or more mainframe services;
automatically generating a script executable by a load testing application in response to the service request, the script to cause the load testing application to convert information associated with the script from a first format to a second format for inclusion in a message to be sent by the load testing application to a send queue in communication with the COBOL application, the first format being compatible with the load testing application and the second format being compatible with the COBOL application;
transmitting one or more transactions to a queuing system including the send queue;
identifying hexadecimal (hex) data associated with the one or more transactions in the send queue;
generating one or more hex files mapping hex data compatible with the COBOL application to hex data compatible with the load testing application, the script being generated based, at least in part, on the one or more hex files; and
selectively switching channels between the queuing system and the mainframe on and off to identify the hex data in the send queue.

2. The method of claim 1, further comprising:
identifying technical information associated with the COBOL application including COBOL variables; and
generating one or more variable files mapping the COBOL variables to variables compatible with the load testing application, the script being generated based, at least in part, on the one or more variable files.

3. The method of claim 2, wherein the technical information includes Protocol Implementation Conformance Statement (PICS) information.

4. The method of claim 2, wherein the variables compatible with the load testing application include one or more C variables.

5. The method of claim 2, wherein the one or more variable files includes at least one verb and noun structure including a verb identifying a process to evaluate and nouns identifying values used in the process.

6. The method of claim 1, further comprising executing the script to cause the load testing application to:
convert the information;
send the converted information to the send queue for delivery to the COBOL application;
receive responsive information from the COBOL application; and
generate one or more reports based, at least in part, on the responsive information.

7. The method of claim 1, further comprising automatically generating results per iteration per virtual user to track executed transactions.

8. A non-transitory machine readable storage medium storing machine readable instructions which, when executed, cause a machine to at least:
- receive a request to execute one or more transactions with a COBOL application of a mainframe to evaluate one or more mainframe services;
- automatically generate a script executable by a load testing application in response to the service request, the script to cause the load testing application to convert information associated with the script from a first format to a second format for inclusion in a message to be sent by the load testing application to a send queue in communication with the COBOL application, the first format being compatible with the load testing application and the second format being compatible with the COBOL application;
- transmit one or more transactions to a queuing system including the send queue;
- identify hex data associated with the one or more transactions in the send queue;
- generate one or more hex files mapping hex data compatible with the COBOL application to hex data compatible with the load testing application, the script being generated based, at least in part, on the one or more hex files; and
- selectively switch channels between the queuing system and the mainframe on and off to identify the hex data in the send queue.

9. A non-transitory machine readable storage medium as defined in claim 8 wherein the instructions, when executed, further cause the machine to:
- identify technical information associated with the COBOL application including COBOL variables; and
- generate one or more variable files mapping the COBOL variables to variables compatible with the load testing application, the script being generated based, at least in part, on the one or more variable files.

10. A non-transitory machine readable storage medium as defined in claim 9 wherein the technical information includes PICS information.

11. A non-transitory machine readable storage medium as defined in claim 8 wherein the variables compatible with the load testing application include one or more C variables.

12. A non-transitory machine readable storage medium as defined in claim 8 wherein the one or more variable files includes at least one verb and noun structure including a verb identifying a process to evaluate and nouns identifying values used in the process.

13. A non-transitory machine readable storage medium as defined in claim 8 wherein the instructions, when executed, further cause the machine to:
- execute the script to cause the load testing application to:
  - convert the information;
  - send the converted information to the send queue for delivery to the COBOL application;
  - receive responsive information from the COBOL application; and
  - generate one or more reports based, at least in part, on the responsive information.

14. A non-transitory machine readable storage medium as defined in claim 8, wherein the instructions, when executed, further cause the machine to automatically generate results per iteration per virtual user to track executed transactions.

15. A system comprising:
- an interface to receive a request to execute one or more transactions with a COBOL application of a mainframe to evaluate one or more mainframe services; and
- a processor configured to
  - automatically generate a script executable by a load testing application in response to the service request, the script causing the load testing application to convert information associated with the script from a first format to a second format for inclusion in a message to be sent by the load testing application to a send queue in communication with the COBOL application, the first format being compatible with the load testing application and the second format being compatible with the COBOL application;
  - transmit one or more transactions to a queuing system including the send queue;
  - identify hex data associated with the one or more transactions in the send queue;
  - generate one or more hex files mapping hex data compatible with the COBOL application to hex data compatible with the load testing application, the script being generated based, at least in part, on the one or more hex files; and
  - selectively switch channels between the queuing system and the mainframe on and off to identify the hex data in the send queue.

16. The system of claim 15 wherein the processor is further configured to:
- create variable files mapping the COBOL variable to variables compatible with the load testing application, the script being generated based, at least in part, on the one or more variable files.

* * * * *